United States Patent [19]
Cinkus et al.

[11] 3,800,165
[45] Mar. 26, 1974

[54] ELECTRONIC PULSE STORAGE DEVICE

[75] Inventors: Frank Cinkus; Richard E. Buchner, both of Milan, Tenn.

[73] Assignee: International Telephone and Telegraph Corporation, New York, N.Y.

[22] Filed: Oct. 13, 1972

[21] Appl. No.: 297,208

[52] U.S. Cl. ................ 307/238, 307/252 J, 307/284
[51] Int. Cl. .......................................... H03k 17/72
[58] Field of Search..... 307/238, 252, 252 J, 252 K, 307/289

[56] References Cited

UNITED STATES PATENTS 3,474,443 10/1969 Lightner et al. ................ 307/252 K
3,375,502 3/1968 Shively............................ 307/238 X
3,564,282 2/1971 Vogelsberg ...................... 307/252 J

*Primary Examiner*—John Zazworsky
*Attorney, Agent, or Firm*—J. B. Raden; M. M. Chaban

[57] ABSTRACT

Disclosed is an electronic pulse storage device which stores direct current pulses for non-destructive readout. The device is comprised of an SCR storage circuit arrangement for each pulse to be stored. The circuit is designed for use in a system subject to noise and transients. The circuit is particularly adaptable for use in telecommunication systems for receiving and storing decoded dial pulses either within the system or from an outside line. In such cases, the storage line is subject to considerable noise and high level transients which are prevented from falsely activating the storage circuits.

6 Claims, 4 Drawing Figures

ELECTRONIC PULSE STORAGE DEVICE

BACKGROUND OF THE INVENTION

In the telecommunication arts, the storage of dc pulses has generally relied on relays as the storage medium. In electromechanical systems especially, relays are generally used since noise problems are of such magnitude that microelectronic and even discrete electronic devices become unfeasible. Further, electromechanical systems, such as telephone, teletype and the like, are frequently subjected to transients on the order of 2,000 volts or more. Such outside effects can cause false signals and can also cause deterioration and failure of electronic components used for such storage. Thus, relays with their inherent isolation between switching and switched circuits have been and remain the usual pulse storage device used in circuits subject to noise and transients, especially electromechanical circuits containing highly inductive relays.

Relays, whether armature or reed, of course, have serious limitations in that they are bulky, have a limited life duration, require considerable power for their operation, and require considerable maintenance and readjustments. Relays must be adjusted originally and the adjustment setting must be maintained in order that the relay continues to operate within its design parameters.

SUMMARY OF THE INVENTION

The present invention relates to an electronic pulse storage device usable in electromechanical circuits subject to considerable noise and high voltage transients. The electronic device is compact and requires considerably less mounting space than its armature relay equivalent device. The moving parts of relays are thus eliminated. Further, through the use of electronic components, the power requirements of relays are reduced for both the operation of the writing or storage function and for the maintenance of the storage.

The circuits, as presently set forth, also eliminate the defects encountered in electronic storage of pulses. The circuit can store pulses, preferably in multiples of five, each storage taking place in a separate storage unit. A pulse, once stored, remains stored with minimum continuing power drain and all pulses stored in the multiple storage units are released simultaneously. No inductive kick or counter e.m.f. is generated by the release of the stored pulses.

Once a pulse is stored on a unit, the stored condition may be read at any time by testing the condition of the input lead, the reading being undertaken non-destructively. The unit in its simplest form will not be destroyed or damaged by noise or transients. In other forms, time and voltage operating thresholds may be incorporated to further minimize false operation and circuit damage due to noise and transients.

It is, therefore, an object of the invention to provide a new and improved electronic pulse storage unit for use in electromechanical circuits subject to noise and transient.

It is a further object of the invention to employ an SCR storage unit which is responsive to a pulse input on one lead, the condition of the SCR being readable from said one input lead non-destructively, as many times as desired.

It is a still further object of the invention to provide a multiple of storage units using SCR storage elements with a single storage destruction lead common to the multiple of units.

The foregoing and other objects, features and advantages of the invention may be understood from the following description viewed in conjunction with the drawings, a brief description of which follows.

DETAILED DESCRIPTION OF THE DRAWINGS

Figure 1:
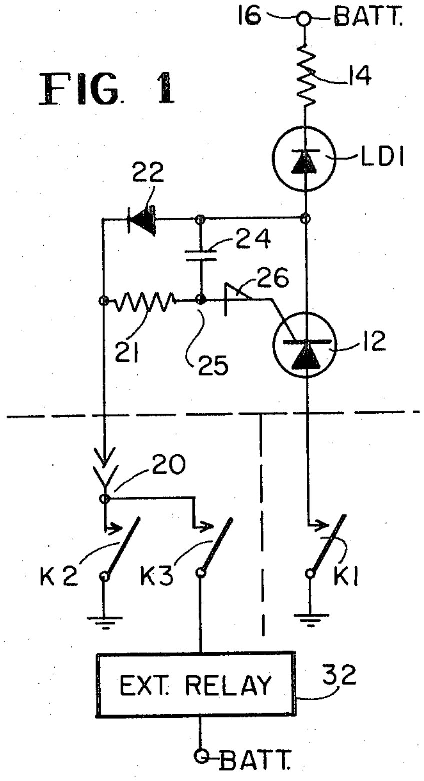
FIG. 1 is a simplified schematic circuit drawing of a single pulse storage unit employing our invention, with the peripheral circuits for storage shown in simplified form.

In FIG. 1, we show a single pulse storage network with three normally open contacts labelled K1, K2 and K3. These may be relay contacts or manual switches, each being closable individually.

Contacts K1, on closure, provide positive potential indicated as ground to the anode of a reverse blocking thyristor or SCR 12. The cathode of SCR 12 is connected to the anode of a light emitting diode LD-1, the cathode of which is connected to resistance 14 and a negative battery source 16 which may be one of −48 volts generally used in telephony.

A second ground path or gate path may be traced through normally open contacts K2 to junction 20 for multiple paths to resistor 21 and parallel thereto, to the cathode of a diode 22. Connected to the anode of diode 22 and across the parallel path is a capacitor 24. The junction 25 of resistor 21 and capacitor 24 is a connection to the anode of a trigger diode 26 used as a threshold detector. The cathode of diode 26 is connected to the gate terminal of SCR 12.

Of the final set of contacts K3, one contact is connected to a junction 20 which, in turn, is connected to the cathode of diode 22. The remaining contact of contacts K3 is connected to the input of a read circuit which is shown as an external read relay 32. The read circuit or relay 32 is suitably biased by connections to the negative, as shown. Relay 32 may be an electromechanical relay with contacts (not shown) which may be placed in any desired configuration.

The operation of the network of FIG. 1 may be described as follows: Contacts K1 are closed to bias the SCR 12 relative to both battery and ground and to enable the SCR for later conduction or firing. When a pulse is to be stored, contacts K2 are closed to introduce a ground pulse to the RC combination of resistor 21 and capacitor 24. If the pulse continues for a period sufficiently long to raise the voltage at junction 25 above the threshold limit of device 26, a gating pulse is fed to the gate terminal of SCR 12 causing the SCR 12 to conduct. Contacts K2 may be opened in any way at the conclusion of the input pulse period.

With SCR 12 conductive, junction point 20 is essentially at ground potential, so long as contacts K1 are retained in the closed condition to maintain suitable bias on the SCR. Light emitting diode LD-1 is rendered conductive with the SCR, providing a visual indication that a pulse has been stored in the unit.

When the condition of the pulse storage unit is to be read, contacts K3 are closed, and the ground condition of junction point 20 may be sensed through diode 22. Relay 32 will respond to the ground at junction 20 and will operate to provide a read-out signal for so long as contacts K3 remain closed. Opening and closure of contacts K3 have no effect on the stored pulse, thus the pulse or fired condition of SCR 12 may be read as many times as desired, as frequently or rarely as necessary.

When it is desired to erase the stored pulse from SCR 12, contacts K1 are returned to the open condition, removing bias from the anode cathode circuit of the SCR, shutting off SCR 12. Diode LD-1, which follows SCR 12, also shuts off, removing the visual indication. The ground is removed from junction 20 and the circuit is restored to its at-rest condition.

Figure 2:
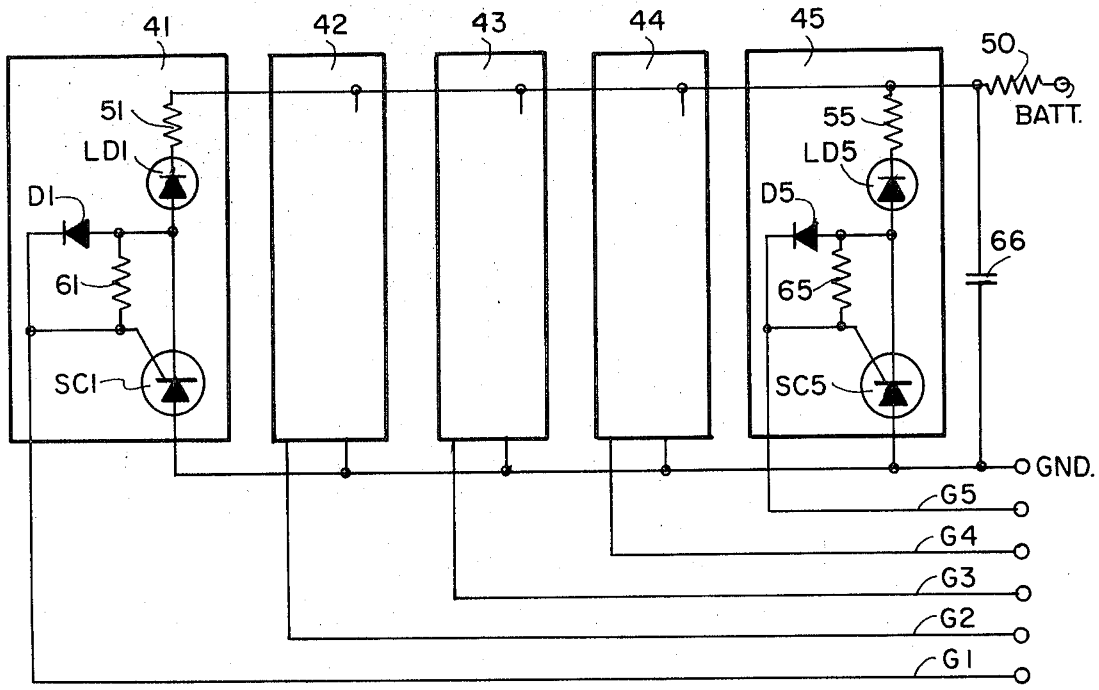
FIG. 2 is a schematic circuit drawing of a first embodiment of our invention.

FIG. 2 is a circuit employing the simplest form of a five unit storage device. There, we show five pulse memory units 41–45, the first and fifth of such memories (41 and 45) shown in detail, the second through the fourth (42–44) being identical to memories 41 and 45, as shown.

Each unit of FIG. 2 has a combined write-read lead labelled G1–G5 for each of the respective units. Each unit has as its main operative element an SCR labelled SC1-SC5, the gate of each SCR being connected directly to its G lead. Shunted across each gate lead is a resistor-diode combination. A common ground lead, labelled GND, is connected in multiple to the anode of each SCR, and a negative battery source labelled BATT is connected through a common resistor 50, to respective cathode resistors 51 and 55, shown. The path from these resistors passes through light emitting diodes LD1-LD5 to the cathodes of the respective SCR's. These resistors 51 and 55 provide a path for holding current for the respective SCR's.

Resistors 61–65 of the resistor diode combination provide the following function: First, these resistors provide a gate current bypass or partial shunt path to decrease the sensitivity of the respective SCR. The values of these resistors may be selected in accordance with the desired gate sensitivity level; the lower resistance values yielding reduced gate sensitivity and increased immunity to undesirable gate transients. The capacitor 66 connected across the battery and ground sources common to all SCR units, provides decoupling for eliminating the effect of line transients.

Placed within an environment such as FIG. 1, closure of paths to Battery and Ground on leads GND and BATT enable the circuit for pulse reception. In the normal condition, a permanent connection is made from the negative battery source to the circuit and the path to the GND connection is opened or closed to enable or disable the storage circuit. Closure of a contact on an input lead of one or more of leads G1–G5 places ground on that lead or leads. With closures of sufficient duration and voltage, the particular SCR or SCR's having received the input ground signal will fire to store the received pulse or pulses. Firing of an SCR or SCR's places the cathode of each fired SCR at ground. The stored pulse or pulses will remain stored after opening of the input lead initiating the storage. At any time thereafter, by scanning the leads G1-G5, the stored pulse or pulses may be read non-destructively from a path or paths through the diode D1-D5 individual to the fired SCR or SCR's. The diodes D1-D5 provide isolation between battery and ground and are poled to provide this read-out. The ground at the cathode of a fired SCR is available to external circuits with high current capacity, the current carrying capacity of the SCR and the diode being the determining factors. When the stored pulse or pulses are to be released, the anode circuit to all SCR's is opened and any fired SCR releases. This circuit, as shown in FIG. 2, can only be used where the system noise is moderate, and within the limits that can be sustained by capacitor 66, by the gate resistors 51–55, and within the inherent parameters of the SCR, as will be explained later.

Figure 3:
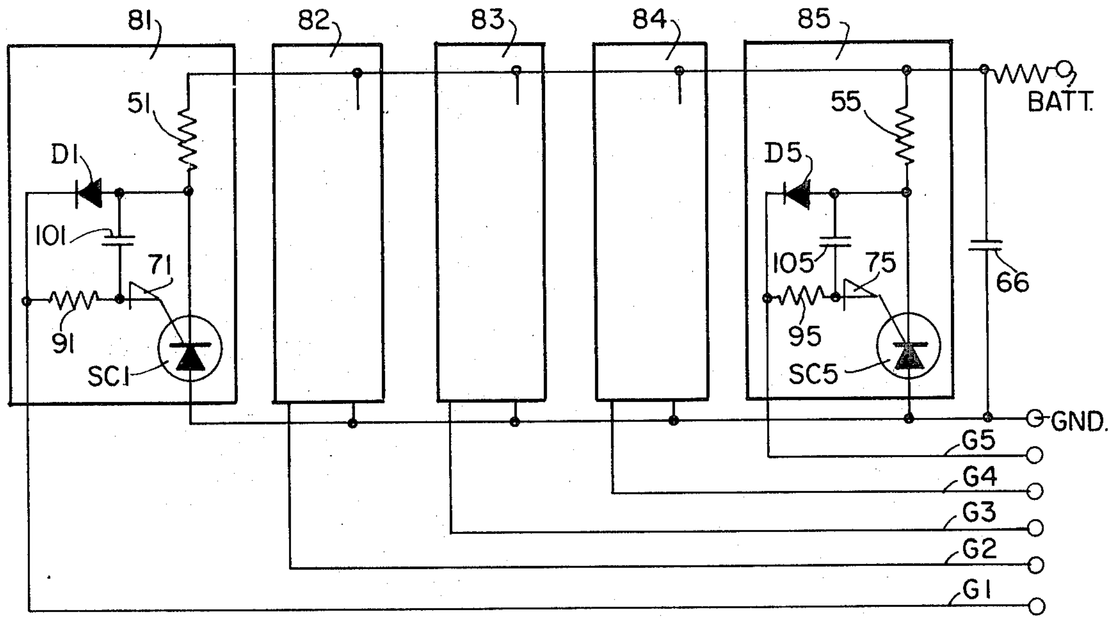
FIG. 3 is a schematic circuit drawing of a second embodiment of our invention.

Under conditions of severe noise or transients, added safeguards must be inserted. One course available, as shown in FIG. 3, is to provide a delay to minimize false signals by using a threshold device such as a DIAC or a four-layer diode 71-75 in each storage unit 81-85. Each DIAC is placed in series with its SCR gate lead. Further in series with each threshold device is a heavy resistor 91–95, possibly in the range of 15–30 k ohms in resistance. The resistor, together with a shunt capacitor 101–105 (replacing the shunt resistor of the prior embodiment), combine with resistors 51–55 to provide a delay period in the operation of the respective SCR's. Thus, when pulse is applied to any one or more of the leads G1–G5 in FIG. 3, the pulse must continue for a predetermined minimum duration and must continue at above the threshold voltage in order to fire any gated SCR.

In telephone usage, a threshold of 20 to 30 volts may be used with a delay of at least ten milliseconds where the present memory device is to store decoded dial pulses. By varying the parameters of the resistor and capacitor providing the R-C delay, the time constant on the delay may be set as desired. Again, the diode may be considered as a commutating diode enabling read-out of a stored pulse non-destructively on the same lead on which the pulse was written or stored.

Figure 4:
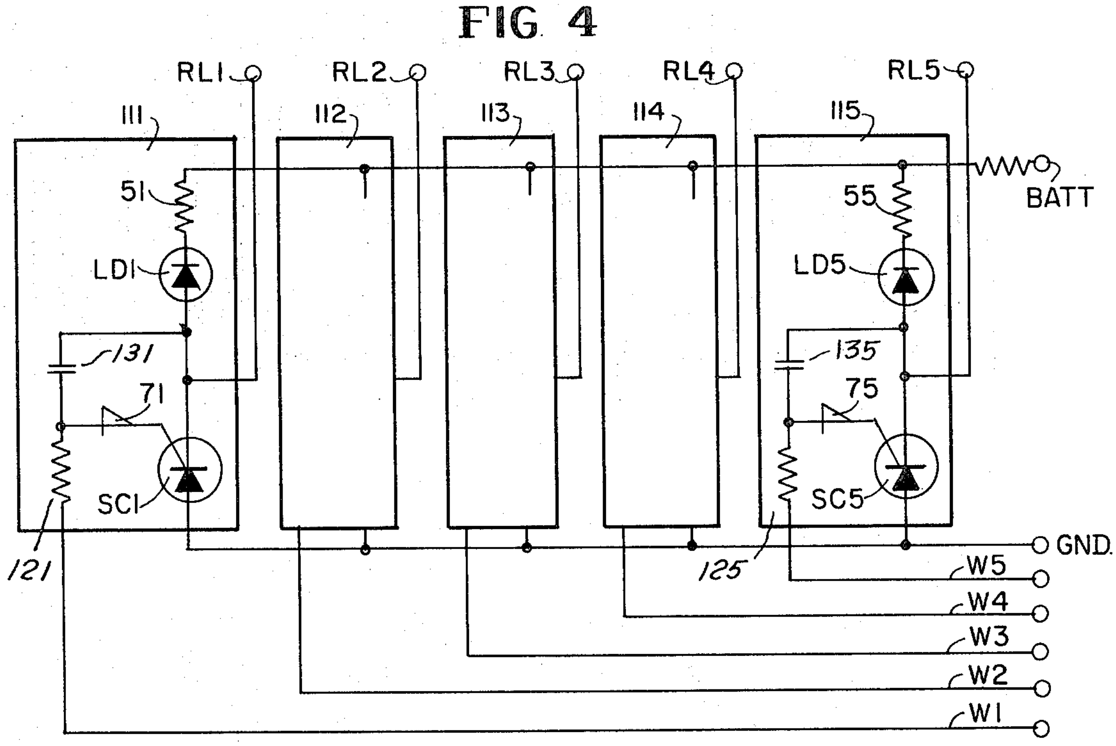
FIG. 4 is a schematic circuit drawing of a third embodiment of our invention.

The circuit of FIG. 4 is somewhat similar to that of FIG. 3. In FIG. 4, the need for a commutating diode for each storage unit has been removed. In its stead, within units 111–115 of FIG. 4, a separate read lead RL1–RL5 is connected to the cathode of each SCR. Thus, in FIG. 4, in place of leads G1–G5, there are provided write leads W1–W5 as the input gating leads coupled to the gate terminals of the respective SCR's. Otherwise, this circuit provides an R-C delay through resistors 121–125 and capacitors 131–135 and threshold voltage level, as explained relative to the embodiment of FIG. 3. This circuit is used in instances where the read function must be divorced from the write function for reasons necessary to the external circuit.

The light emitting diodes LD1–LD5, provided in the cathode circuit of each embodiment, provide a visual display of stored pulses to aid in monitoring, maintaining and trouble-shooting of the system.

To perform satisfactorily in the circuits shown, we have found that a shorted-emitter type thyristor SCR is necessary to provide gate protection from transients and the like. This type of SCR has an insensitive gate which requires current on the order of 1 to 10 ma. to operate. In addition, this type of device has a high dv/dt rating to protect against "breaking over" or transient firing. We found that a thyristor rated for operation at up to 100 volts and having a maximum average forward current rating of 1.6 amps operates successfully in our system as described.

We claim:

1. A direct current pulse storage network comprising a single pulse storage unit including a thryristor having anode, cathode and gate terminals, a firing path to said gate terminal, means in said firing path to said gate terminal for decreasing the sensitivity of said gate terminal, means coupled to said cathode terminal for non-destructively reading the condition of said thyristor as fired or non-fired, further means coupled to said cathode terminal for providing holding current for said thyristor when fired, and said reading means comprises a commutating diode coupling the cathode of said thyristor to said gate terminal firing path for reading the condition of said thyristor on the gate terminal firing path.

2. A storage network as claimed in claim 1, wherein there are a plurality of like storage units in multiple with one thyristor in each unit, and each of said thyristors is of the shorted-emitter type, and individual gate conductors connected to each thyristor gate terminal for selectively firing one or more of said thyristors individually, and common bias means for all said units for enabling and disabling all said units simultaneously.

3. A network as claimed in claim 1, wherein there is a threshold device and a time relay network both coupled between said gate terminal and said firing path for further decreasing the sensitivity of said gate terminal.

4. A pulse storage network comprising a plurality of individual pulse storage units each including a thyristor having anode, cathode and gate terminals, and each thyristor having inherent gating characteristics insensitive to gate current of less than one to two milliamps, a firing path coupled to each gate terminal, means in each firing path for further decreasing the sensitivity of the respective gate terminal, means individual to each unit for selectively emitting a firing signal to one or more firing paths for firing the respective thyristor, means coupled to each cathode terminal for non-destructively reading the condition of the respective thyristor as fired or non-fired, further means coupled to each cathode terminal for providing holding current for the respective thyristor when fired, and each said reading means comprises a commutating diode connected to couple the cathode of each respective thyristor to the gate terminal path, to enable read out on the firing paths of the network.

5. A storage network as claimed in claim 4, wherein each of said thyristors is of the shorted-emitter type, and common bias control means for all said units for enabling and disabling all said units simultaneously.

6. A network as claimed in claim 4, wherein there is a voltage threshold apparatus and a time delay apparatus in each unit, both apparatus being coupled between the respective gate terminal and said firing path for further decreasing the sensitivity of the respective gate terminal, and visual signalling means in each unit responsive to the firing of the respective thyristor for indicating the fired condition.

* * * * *